Patented Sept. 29, 1953

2,653,935

UNITED STATES PATENT OFFICE 2,653,935

METHOD OF PREPARING METHYL ISOMELAMINE

Donald W. Kaiser, Old Greenwich, Conn., assignor to American Cyanamid Company, New York, N. Y., a corporation of Maine No Drawing. Application June 15, 1951, Serial No. 231,894

4 Claims. (Cl. 260—249.6)

The present invention relates to an improved process for the preparation of methyl isomelamine methyl hydrogen sulfate.

In the past the only method known for preparing methyl isomelamine in good yield was to heat melamine with dimethyl sulfate for a considerable period of time, whereby methyl isomelamine as the methyl hydrogen sulfate salt was prepared in a yield of 60% to 65%. This method is disclosed in U. S. Patent 2,485,983 to Nagy.

It has now been found that if the Nagy process is conducted in an ether menstruum of the group consisting of a dialkyl Cellosolve and dioxane the yield of methyl isomelamine is greatly increased. Other advantages of the instant invention over the Nagy process is that the use of dioxane permits a considerably shorter reaction time and avoids the completely solid reaction mass inherent in the Nagy process, which is difficult to handle on a large scale.

The following examples illustrate the invention.

Example 1

1 mol of dimethyl sulfate and 1 mol of melamine slurried in 500 cc. of dioxane (the latter dried over calcium sulfate) are refluxed together for 4 hours at a reflux temperature of about 100° C. After cooling, the resulting slurry is filtered and the solid (methyl isomelamine methyl hydrogen sulfate) is washed several times with benzene, using a total of 350 cc. of benzene. After air drying, the methyl isomelamine methyl hydrogen sulfate weighs 249 g. (theory equals 252 g.).

Example 2

Proceeding analogously to Example 1, a slurry of 1 mol of dimethyl sulfate and 1 mol of melamine in 500 cc. of diethyl Cellosolve,

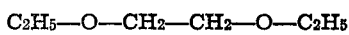

was refluxed for six hours to give 250 g. of methyl isomelamine methyl hydrogen sulfate (theory, 252 g.). The product was worked up and recovered as in Example 1.

Other dialkyl Cellosolves (of the formula

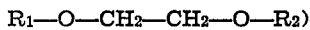

are also satisfactory in giving improved yields and facilitating the reaction, e. g., where either $R_1$ and $R_2$ is an alkyl radical such as methyl, ethyl, propyl, butyl, and the like, the R's being the same or different.

The free base can be prepared by neutralizing the salt in the known way, e. g., the solid product obtained above is dissolved in hot water, and 1 mol of 20% sodium hydroxide is added dropwise thereto at about 35° C. while allowing the solution to cool. After the addition of the sodium hydroxide is complete, the mixture is cooled in an ice bath to crystallize the methyl isomelamine monohydrate. This material is filtered, suspended in 200 cc. of water, cooled, filtered, and washed with an additional 200 cc. of ice cold water. The moist methyl isomelamine monohydrate is then dried in a vacuum dessicator over sulfuric acid to provide the free base, a sample of which decomposes at 238° C. The yield of methyl isomelamine monohydrate is 80%.

The ratio of reactants can be varied considerably without affecting the increased yield (the yield being calculated on the reactant present in the minor proportion), e. g., the melamine: dimethyl sulfate mol ratio can be in the range 1-10:1-10, etc., without affecting the improvement resulting from the use of the ether menstrua specified. It is preferred, however, to use equimolar amounts of reactants, since any excess of either remains unreacted.

The amount of ether menstruum to be used is not critical, but preferably should be sufficient to provide a fluid slurry. Dimethyl sulfate dissolves freely in the ethers specified, but melamine is only sparingly soluble in them.

The reaction can be caried out over a temperature range varying from about 80° C. up to the reflux temperature of the reactant mixture. It is preferred to conduct the reaction under reflux conditions.

While the invention has been described with particular reference to specific embodiments, it is to be understood that it is not to be limited thereto but is to be construed broadly and restricted solely by the scope of the appended claims.

I claim:

1. In the method of preparing methyl isomelamine methyl hydrogen sulfate by heating together melamine and dimethyl sulfate, the improvement that comprises conducting the reaction in an ether of the group consisting of a dialkoxy ethylene of the formula

and dioxane.

2. The method which comprises refluxing an equimolar mixture of melamine and dimethyl sulfate in dioxane to form methyl isomelamine hydrogen sulfate, and recovering the thus-formed methyl isomelamine methyl hyrogen sulfate.

3. The method which comprises refluxing an equimolar mixture of melamine and dimethyl sulfate in a dialkoxy ethylene of the formula alkyl—O—CH₂CH₂—O—alkyl to form methyl isomelamine hydrogen sulfate, and recovering the thus-formed methyl isomelamine methyl hydrogen sulfate.

4. The method which comprises refluxing an equimolar mixture of melamine and dimethyl sulfate in a diethoxy ethylene of the formula C₂H₅—O—CH₂CH₂—O—C₂H₅ to form methyl isomelamine hydrogen sulfate, and recovering the thus-formed methyl isomelamine methyl hydrogen sulfate.

DONALD W. KAISER.

References Cited in the file of this patent

UNITED STATES PATENTS

| Number | Name | Date |
|---|---|---|
| 2,191,361 | Widmer | Feb. 20, 1941 |
| 2,392,607 | Nagy | Jan. 8, 1946 |
| 2,481,758 | Kaiser | Sept. 13, 1949 |
| 2,485,983 | Nagy | Oct. 25, 1949 |